Jan. 23, 1962     A. P. COLAIACO ET AL     3,018,417

DETECTION CIRCUIT

Filed Sept. 19, 1958

WITNESSES
Leon J. Faza
Myron E. Dick

INVENTORS
August P. Colaiaco, Lalan G. Miller
and Edward J. Cham
BY
F. E. Browder
ATTORNEY

United States Patent Office 3,018,417
Patented Jan. 23, 1962

3,018,417
DETECTION CIRCUIT
August P. Colaiaco, Forest Hill, Lalan G. Miller, Pittsburgh, and Edward J. Cham, Irwin, Pa., assignors to Westinghouse Electric Corporation, East Pittsburgh, Pa., a corporation of Pennsylvania
Filed Sept. 19, 1958, Ser. No. 762,094
3 Claims. (Cl. 317—52)

This invention relates to detection circuits in general, and in particular, to failure detection circuits for electrical components connected in series.

The use of semiconductor diodes and power rectifiers for relatively high voltages requires the series connection of numerous rectifier elements utilized in said power rectifiers. Should a failure occur in one of the elements in said series group a higher proportional peak inverse voltage is applied to the remaining elements in the series group. Therefore, it is desirable to detect the failure of any element in a series group to prevent stressing the remaining series elements. Prompt detection permits replacement of the failed element thereby preventing unnecessary further failures of elements.

It has been common practice to supply individual detector devices across each element. This is satisfactory for small installations. Since some electrical installations require between several hundred and several thousand elements, it is apparent that this method of element failure detection is very cumbersome and expensive. The application of semiconductor diodes to power rectifier installations is one of the latest examples of series connections of electrical components to provide a proper rating so that each individual rectifier is not utilized above its rated usage, particularly its peak inverse voltage rating.

Accordingly, it is an object of this invention to provide an improved detection circuit for discerning the failure of electrical component elements connected in series.

It is another object of this invention to provide an improved circuit for failure detection for semiconductor elements connected in series in power rectifier applications.

It is still another object of this invention to provide an improved failure detection circuit for series connected semiconductor rectifier elements that will operate satisfactorily with variations in a direct current output voltage as normally encountered during operating conditions of a power rectifier installation.

Further objects of this invention will become apparent from the following description when taken in conjunction with the accompanying drawing. In said drawing, for illustrative purposes only, there is shown a preferred embodiment of the invention.

Figure 1:
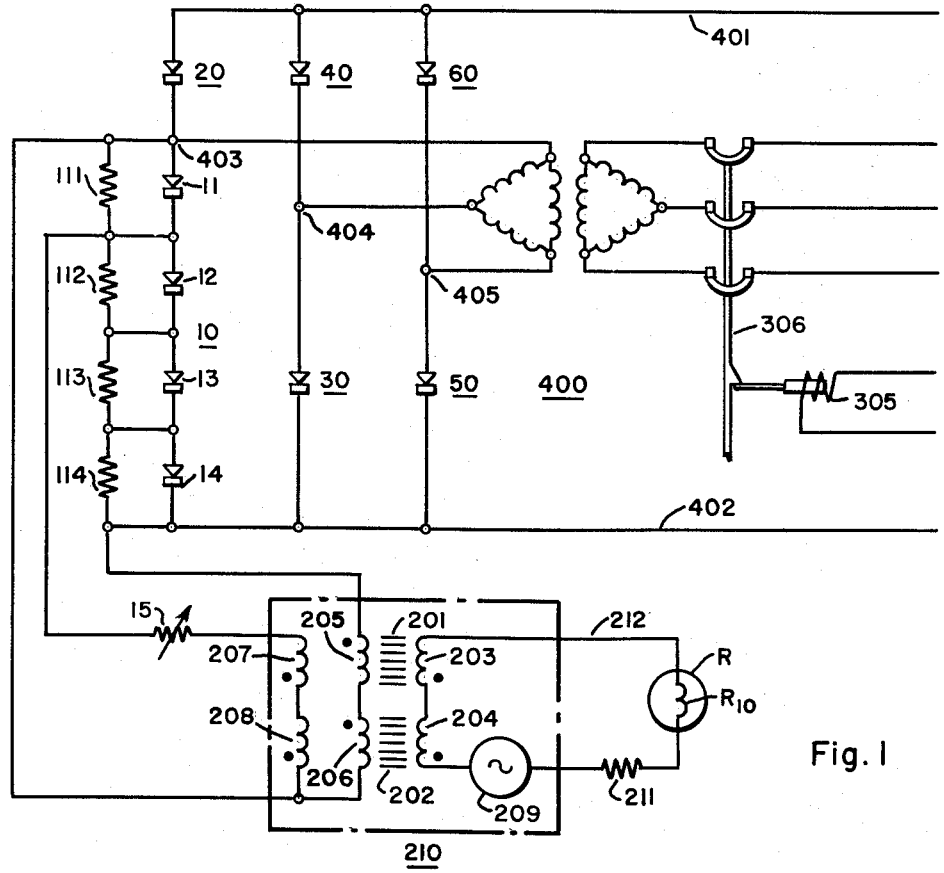
Figure 2:
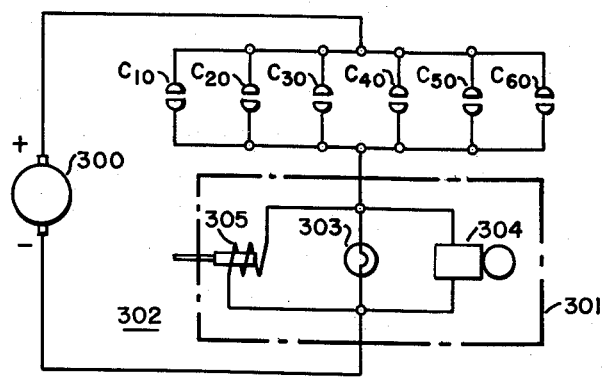

FIGURE 1 is a schematic diagram of a detection circuit embodying the teachings of this invention; and FIG. 2 is an alarm energization circuit to be utilized in conjunction with the apparatus of FIG. 1.

Referring to the drawing, there is shown a power rectifier 400 which is shown, for the purpose of explaining the teachings of this invention, as a three-phase rectifier bridge. The power rectifier unit 400 comprises two direct current buses 401 and 402. Connected in parallel between the buses 401 and 402 are individual rectifier legs 10, 20 and 30, 40 and 50, 60. The legs 20, 30, 40, 50 and 60 have been shown as only a single rectifier diode as representing a string of series connected rectifier diodes for the purposes of simplicity. The terminals 403, 404 and 405 are provided at the junctions of the rectifier strings 10, 20 and 30, 40 and 50, 60 for applying a three-phase voltage source, not shown, which is to be rectified.

The series string contained in the rectifier leg 10 comprises a plurality of series connected rectifier semiconductor diodes 11, 12, 13 and 14. Connected in parallel with each respective semiconductor diode are voltage dividing resistors 111, 112, 113 and 114.

A magnetic amplifier designated generally at 210 is provided to detect the voltage difference appearing across each rectifier unit in the series leg 10 upon the failure of a single rectifier unit in that string 10. The magnetic amplifier 210 comprises a saturable magnetic core 201 having inductively disposed thereon a load winding 203, a first control winding 205 and a second control winding 207, and a saturable magnetic core 202 having inductively disposed thereon a load winding 204, a first control winding 206 and a second control winding 208. The load windings 203 and 204 are to be connected in series with an alternating supply voltage 209 and a relay coil $R_{10}$. The first control windings 205 and 206 are serially connected across the entire series string of semiconductor rectifier units in the leg 10 of the power rectifier installation 400. The second control windings 207 and 208 are serially connected with an adjustable resistor 15 across any one of the semiconductor rectifier units in the series string 10. In the embodiment shown in the drawing, the second control windings 207 and 208 are connected across the semiconductor rectifier unit 11.

Referring to FIG. 2, there is shown an alarm circuit for the failure detection circuit illustrated in FIG. 1. For each of the series strings 10, 20, 30, 40, 50 and 60 there is to be a detection circuit such as is illustrated in FIG. 1 for the series string 10, however, the remainder of the detection circuits have been omitted for the purposes of simplicity. Each of the detection circuits will have a magnetic amplifier as shown for the series string 10 and each of the magnetic amplifiers will have as its load, a relay coil of an associated relay. The contacts of the respective relays for each of the individual series string may be arranged in a number of different circuits to give a desired alarm. One such arrangement is shown in FIG. 2. The contacts $C_{10}$, $C_{20}$, $C_{30}$, $C_{40}$, $C_{50}$ and $C_{60}$ of relays associated with magnetic amplifiers of each of the series strings 10, 20, 30, 40, 50 and 60, respectively, have been connected in parallel circuit relationship. This parallel circuit has been connected in series with an alarm device 301 and a voltage supply 300. Thus, the failure of a single element in any one of the series strings causes the closing of a contact in the parallel circuit of FIG. 2. The closing of the contact in the parallel circuit of FIG. 2 allows energization of the alarm means 301 by the voltage supply 300. The alarm means 301 may be an indicating lamp 303, a buzzer 304, or may be utilized to activate a trip coil 305 of a circuit breaker 306 to deenergize the entire power rectifier installation 400.

Referring again to FIG. 1, it is seen that a first control winding means 205 and 206 of the magnetic amplifier 210 is connected across all of the elements in the series string 10. The second control winding means 207 and 208 is connected across a single element in the series string 10. The magnetic amplifier 210 is so designed that the total control ampere-turns applied by the first and second control winding means to the saturable magnetic cores 203 and 204 are zero when voltage is applied to the power rectifier installation 400. The adjustable resistor 15 provides for an on-the-job adjustment to attain zero total control ampere-turns.

With zero control ampere-turns applied to the magnetic amplifier 210, the alternating supply voltage 209 in cooperation with the load windings 203 and 204 drives the saturable magnetic cores 201 and 202 to positive saturation on one half-cycle and to negative saturation on the next half-cycle. That is, the volt-seconds of the alternating power source 209 are totally absorbed in cycling the saturable magnetic cores 201 and 202 between positive and negative saturation on alternate half-cycles. The relay whose relay coil $R_{10}$ is shown connected to the output of the magnetic amplifier 210 must be so designed that the exciting current flow through the windings 203 and 204 while the cores 201 and 202 are being cycled between positive and negative saturation, is not sufficient to cause the relay R to pickup and close the contacts $C_{10}$. The value and magnitude of this exciting current flow through the relay coil $R_{10}$ is very small and may be easily controlled to avoid picking up of the relay R by several suitable means that are well-known to those skilled in the art. One such means is the connection of a resistor 211 in series with the relay coil $R_{10}$ to limit the current flow therethrough.

It may be seen that any failure of a single rectifier unit in the series string 10 will cause an unbalance in the total control ampere-turns applied to the first and second control winding means of the magnetic amplifier 210. For example, if any rectifier unit besides the rectifier unit 11 fails, then the peak inverse voltage across all of the remaining rectifier units, including the rectifier unit 11, will rise in a proportion determined by the number of rectifiers in the series string 10. The rise in voltage as reflected across the rectifier unit 11 applies more ampere-turns through the second control winding means 207, 208 than are supplied through the first control winding means 205, 206. Thus, an output from the magnetic amplifier 210 to the relay coil $R_{10}$ will be obtained. If the rectifier unit 11 itself fails then there will be a drop in the voltage applied to the second control winding means 207, 208, again throwing the applied total control ampere-turns out of balance, allowing the magnetic amplifier 210 to deliver an output to the relay coil $R_{10}$.

Although a two core, six winding magnetic amplifier is shown for the magnetic amplifier 210, any magnetic amplifier may be utilized which will respond to an unbalance in its total applied control ampere-turns and will deliver an output to a relay coil $R_{10}$. Also, as is known to those skilled in the art, the control currents obtained from across a single rectifier unit and from across the entire string of rectifier units may be applied by various circuit means to a single pair of control windings to furnish an unbalance sensing and deliver an output to a relay coil $R_{10}$. The output of the magnetic amplifier 210 may be connected to other alarm energizing circuits or devices as desired for the particular application. The function of the magnetic amplifier 210 is to deliver an output upon the failure of a single rectifier unit in the series string 10.

The conductor 212 connecting said output windings 203, 204 to the relay coil $R_{10}$ of said relay R may also be termed an alarm bus. The alarm bus 212 may be connected through isolating rectifier or other circuit means to a common alarm bus for the system. However, the important function of the apparatus shown is to provide a signal or current flow in the alarm bus 212. There must also be circuit means responsive to a current flow in the alarm bus 12 caused by the failure of a series diode.

This circuit means responsive to current flow in the alarm bus 212 may either actuate an alarm or means deenergizing the installation 400 by itself or be operable to energize an alarm or other suitable circuit, as hereinbefore discussed. That is, the relay R is operable to energize an alarm circuit 302 by the closure of contacts $C_{10}$.

It should be noted that the apparatus of FIGS. 1 and 2 will operate satisfactorily with variations in the direct current output voltages or voltage of the power rectifier installation 400 since the connections to the control windings of the magnetic amplifier are comparable to a voltage divider network and a proportional voltage divided will remain in the same proportion and thus furnish a balance of control ampere-turns to the magnetic amplifier 210 even though the total voltage across the entire series string 10 varies from a constant value.

To summarize, it is seen from the foregoing that this invention provides a reliable static system comprising a magnetic amplifier, for detecting when one or more semiconductor rectifiers in a series connected string of semiconductor rectifiers has failed. The invention also provides means for giving an alarm and disconnecting the supply voltage upon failure of one or more rectifiers in a series connected string of semiconductor rectifiers.

In conclusion, it is pointed out that while the illustrated example constitutes a practical embodiment of our invention, we do not limit ourselves to the exact details shown, since modification of the same may be effected without departing from the spirit and scope of this invention.

We claim as our invention:

1. In combination, a plurality of semiconductor rectifier units connected in series circuit relationship, an impedance means connected in parallel circuit relationship with each of said rectifier units, means for applying a supply voltage to said series connected rectifier units, means for detecting the failure of said rectifier units, said means comprising a magnetic amplifier having first and second control windings and an output winding, said first control winding being connected across at least one of said impedance means and being responsive to the voltage across said one impedance means, said second control winding being connected across all of said impedance means and being responsive to the voltage across all of said impedance means, means for balancing the voltage applied to said control windings for normal operation of all of said rectifiers, said voltage on said control windings becoming unbalanced upon failure of one of said rectifiers, said magnetic amplifier delivering an output voltage to said output winding when the voltage on said control windings becomes unbalanced, said output windings being connected to an alarm bus.

2. In combination, a plurality of semiconductor rectifier units connected in series circuit relationship, an impedance means connected in parallel circuit relationship with each of said rectifier units, means for applying a supply voltage to said series connected rectifier units, means for detecting the failure of said rectifier units, said means comprising a magnetic amplifier having first and second control windings and an output winding, said first control winding being connected across at least one of said impedance means and being responsive to the voltage across said one impedance means, said second control winding being connected across all of said impedance means and being responsive to the voltage across all of said impedance means, means for balancing the voltage applied to said control windings for normal operation of all of said rectifiers, said voltage on said control windings becoming unbalanced upon failure of one of said rectifiers, said magnetic amplifier delivering an output voltage to said output winding when the voltage on said control windings becomes unbalanced, said output windings being connected to means to operate a circuit breaker for interrupting the application of said supply voltage.

3. In combination, a plurality of semiconductor rectifier units connected in series circuit relationship, a resistor connected in parallel circuit relationship with each of said rectifier units, means for applying a supply voltage to said series connected rectifier units, means for detecting the failure of said rectifier units, said means comprising a magnetic amplifier having first and second control windings and an output winding, said first control winding being connected across at least one of said resistors and being responsive to the voltage across said one resistor, said second control winding being connected across all of said resistors and being responsive to the voltage across all of said resistors, means for balancing the voltage applied to said control windings for normal operation of all of said rectifiers, said voltage on said control windings becoming unbalanced upon failure of one of said rectifiers, said magnetic amplifier delivering an output voltage to said output winding when the voltage on said control windings becomes unbalanced.

References Cited in the file of this patent

UNITED STATES PATENTS

| | | |
|---|---|---|
| 2,763,828 | Jensen | Sept. 18, 1956 |
| 2,782,404 | Bergman | Feb. 19, 1957 |
| 2,813,243 | Christian | Nov. 12, 1957 |
| 2,878,437 | Christie | Mar. 17, 1959 |
| 2,895,085 | Siedband | July 14, 1959 |

FOREIGN PATENTS

| | | |
|---|---|---|
| 127,734 | Austria | Apr. 11, 1932 |
| 902,182 | France | Aug. 21, 1945 |
| 1,019,814 | France | Jan. 27, 1953 |